US 6,697,464 B1

(12) United States Patent
Nelson et al.

(10) Patent No.: US 6,697,464 B1
(45) Date of Patent: Feb. 24, 2004

(54) SYSTEM AND METHOD FOR INTERFACING A MODEM'S DIGITAL INTERFACE TO A PBX TELEPHONE

(75) Inventors: Jon A. Nelson, Bluffdale, UT (US); Tim U. Price, Bountiful, UT (US); Aaron Littlefield, Salt Lake City, UT (US); Rich Erekson, Ogden, UT (US)

(73) Assignee: 3Com Corporation, Santa Clara, CA (US)

( * ) Notice: Subject to any disclaimer, the term of this patent is extended or adjusted under 35 U.S.C. 154(b) by 492 days.

(21) Appl. No.: 09/665,531

(22) Filed: Sep. 19, 2000

Related U.S. Application Data

(63) Continuation-in-part of application No. 09/317,419, filed on May 24, 1999, which is a continuation-in-part of application No. 09/087,377, filed on May 29, 1998, now Pat. No. 6,222,910.

(51) Int. Cl.[7] .............................................. H04M 11/00
(52) U.S. Cl. .................................................... 379/93.05
(58) Field of Search .......................... 379/93.05, 93.01, 379/93.09, 93.28, 93.29, 442, 93.37; 375/222

(56) References Cited

U.S. PATENT DOCUMENTS

| 4,543,450 | A | * | 9/1985 | Brandt ........................ 179/2 C |
| 4,907,267 | A | * | 3/1990 | Gutzmer ...................... 379/442 |
| 5,059,141 | A | * | 10/1991 | Scott ........................... 379/442 |
| 5,444,770 | A | * | 8/1995 | Davis et al. .................. 379/442 |
| 5,455,859 | A | * | 10/1995 | Gutzmer ...................... 379/442 |
| 5,625,679 | A | * | 4/1997 | Gutzmer ........................ 379/99 |
| 6,219,732 | B1 | * | 4/2001 | Henrie et al. ................ 710/102 |

* cited by examiner

Primary Examiner—Stella Woo
(74) Attorney, Agent, or Firm—Workman Nydegger

(57) ABSTRACT

The present invention is directed to a novel system and method for connecting and interfacing a communications device, such as a modem, to a two-wire telephone line via a telephone base set (e.g., PBX or PBX-like), thereby allowing for data communications on the telephone line. The modem and the telephone base are interconnected by way of an interface adapter. Interface circuitry present within the interface adapter converts the digital interface (e.g., a wireless or cellular interface) into a PBX-compatible interface for interaction with a PBX phone base set. The interface adapter allows a modem that has a digital peripheral interface such as a cellular interface to communicate with a PBX base using the existing cellular interface. In a preferred embodiment, the system also includes a cable detector circuit that allows the modem to automatically detect when it is connected to a telephone base by way of the interface adapter.

16 Claims, 10 Drawing Sheets

SYSTEM AND METHOD FOR INTERFACING A MODEM'S DIGITAL INTERFACE TO A PBX TELEPHONE

This patent application is a continuation-in-part of a United States Patent Application, "Apparatus for Connecting a Communications Device to a Telephone Line Via a Telephone Base" filed May 24, 1999, Ser. No. 09/317,419, to Tim U. Price, et al., which is a continuation-in-part of United States Patent Application entitled "A System and Method for Connecting and Interfacing a Communications Device to a Telephone Line Via a Telephone Set" filed May 29, 1998, Ser. No. 09/087,377 now U.S. Pat. No. 6,222,910 to Tim U. Price et al., which is incorporated herein in its entirety by reference.

BACKGROUND OF THE INVENTION

1. The Field of the Invention

This invention relates to communication systems that are used by computer equipment to communicate data across public or private telephone lines. More particularly, the invention relates to a system and method for connecting and interfacing a communications device to a telephone line via a telephone set.

2. Related Technology

3. The Relevant Technology

Increasingly, users of personal computers and related equipment rely on the ability to utilize public and private telephone lines to transmit and receive data. This capability dramatically increases the value and usefulness of the computer, as well as the overall productivity of the computer user. As the availability of personal communications equipment, remotely accessible public and private networks, databases, computer-based bulletin boards and related computer services continues to increase, the need to have reliable and consistent access to telephone communication links will continue to grow.

As is well known, equipment such as personal computers and facsimile machines communicate across telephone lines equipment known as a "modem." The term modem is an acronym derived from the phrase "modulator-demodulator," which is descriptive of the basic function performed by the modem. A modem enables digital equipment to interface with the public telephone network, which is designed to carry analog type "voice" signals. The modem accomplishes this by modulating the outgoing digital data so that it is compatible with the analog signal format used by the telephone network. Similarly, the modem reverses the process by demodulating incoming analog signals from the telephone network into the digital signal format that is compatible with most computer equipment.

The standard telephone line, whether public or private, utilizes a two-wire communication path—wherein one wire forms a transmission path and the other forms a receive path. Similarly, most communication devices, including modems and telephone sets, have a two-wire transmit path and a receive path that corresponds with the two-wire telephone line. Ideally, the transmit wire and the receive wire of the communication device (often referred to as the "tip" and the "ring" lines) are connected directly to the corresponding two wires of the telephone line via a RJ-type module and plug/cable detachable interface arrangement. However, under many circumstances such a direct interface is either impractical, inconvenient and/or not physically or electrically possible.

Typically, a communication device such as a personal computer modem, does not have access to a separate and dedicated phone line reserved solely for data communications. This is especially true in telephone systems which utilize a central Private Branch Exchange (PBX), where many telephone lines are serviced by a central PBX controller. In such an arrangement, which is common in many offices, hotels, schools and similar buildings, the telephone equipment is not connected directly to the public telephone network. Rather, the PBX acts as an automatic switching system to interconnect communication devices, such as telephone sets, within a building or campus of buildings. When communication is required outside of the building, the PBX acts as a multiplexing gateway to the public telephone network. Consequently, the providing of dedicated telephone lines for modems is often an impractical and inefficient use of a PBX system, and could result in a need for additional public telephone lines that may not be used to full capacity.

Thus, in a typical telephone environment, a user may desire to have both voice and data communication capabilities over a single telephone line. Often however, it is difficult to share a line between a modem and a telephone set. For instance, in many PBX systems a telephone set, specifically designed for use with the particular PBX controller, must always be coupled to the telephone line. Decoupling of the telephone set from the line may disrupt the PBX controller and thereby prevent proper line selection for outgoing communications. As such, a user cannot simply unplug the telephone set from the phone jack and plug in the computer modem to access the public telephone network.

Also, some PBX systems may utilize modular phone jacks that are not of a conventional size and/or shape, or which utilize a different electrical interface. Often, such an arrangement will not be compatible with the standard RJ-type connector found on many modems, and the user cannot physically and/or electrically interconnect with the telephone line. A similar problem occurs when there is not a modular wall/jack connector available to the modem user. For instance, some office buildings and many hotel rooms have telephone sets that are hard-wired directly into the telephone line, rather than via a RJ-type modular plug and jack arrangement. Again, the modem cannot be physically interconnected with the telephone line, and it is therefore rendered useless.

Even in those instances where a single telephone line can be used both for both voice and data transmissions, the line must be physically shared between the telephone set and the modem Under this arrangement, the telephone set must be physically disconnected from the telephone line in order to connect the modem, and vice-versa. This process is time consuming, awkward and inefficient, and does not allow an effective or efficient sharing of the single phone line.

It will be appreciated that the above problems to gaining access to the telephone network can prevent the effective use of any communication device. However, such difficulties are especially problematic for the increasing number of users of portable computers (referred to variously as laptop, notebook, subnotebook or palm-top computers), for whom the ability to access the public telephone network is extremely important. These types of personal computers are often equipped with internal modem and facsimile devices, and, due to their mobility, must be capable of accessing telephone lines under a wide variety of circumstances—including those discussed above.

Solutions to the problems encountered when attempting to access the public telephone network for data communications have heretofore not been entirely satisfactory. As mentioned above, in the typical telephone set the telephone base uses a two-wire communications connection that is coupled directly to the two-wire telephone line. The telephone set also includes a handset, which is coupled to the telephone base via a handset cord. Usually, the handset cord has a modular RJ-type plug at one end, which detachably mates with a handset jack mounted in the telephone base. The telephone base includes circuitry that converts incoming and outgoing signals from the two-wire telephone line connection to a four-wire connection at the handset jack. This is because the wiring between the base and the handset includes a pair of microphone lines (i.e., a pair of transmitting lines) and a pair of speaker lines (i.e., a pair of receiving lines), which collectively couple the base hardware to a microphone and speaker mounted in the handset.

Given this standard arrangement, one solution to the above mentioned problems has been to provide an interface adapter that allows the modem to connect to the telephone line via the telephone set. Under this approach, the telephone base remains interconnected with the two-wire phone line, and the modem connects, via the adapter, to the handset jack mounted in the telephone base. The handset and handset cord are also connected to the adapter, and the user may, by operating a switch on the adapter, use the phone line for voice or data communications.

However, when in a data communication mode, the adapters of this sort must include conversion circuitry that interfaces the two wires of the modem with the four wires of the telephone handset jack—essentially duplicating the function already performed in the telephone base. Consequently, these adapters require additional circuit components and an independent power supply, thereby resulting in an adapter which has a higher overall cost. Further, to accommodate the additional conversion circuitry, the adapter is necessarily larger and bulkier—a characteristic that is particularly inconvenient to users of portable computers.

In addition, the prior art adapters allow a modem to connect to any one of many different types of telephone sets. As such, the adapters include circuitry that regulates the voltage level of the transmit signal (i.e., the "volume" of the signal) that is generated by the modem and supplied to the telephone base. This is done to avoid problems such as feedback, signal distortion and signal loss, and to insure that the data signals generated by the modem are accurately transferred to the telephone line after passing through the telephone base. This voltage level is typically adjusted by way of a manual switch and circuit arrangement. Again, this approach necessarily results in a costlier, more complex, and physically larger adapter. Further, manual adjustment of the transmit signal amplitude may not be sufficiently precise, and could potentially result in loss of data—especially at the high transmission speeds of today's modems.

Finally, in order to establish a data communications link with adapters of this type, a precise sequence must be followed by the modem user. Typically, the user must first insure that adapter is properly connected to the computer modem and then set the transmit "volume" level to one that corresponds with the type of telephone set being used. The user must then remove the handset from the phone base cradle and listen for a dial tone. The user must then immediately cause the modem to dial a phone number, or risk losing the dial tone. If the sequence is deviated from at any step, the modem will not be able to establish a communication link, and the process must be repeated. As will be appreciated, this approach can be confusing to many modem users, and often is the source of error when attempting to establish a data communication link.

OBJECTS AND BRIEF SUMMARY OF THE INVENTION

The present invention has been developed in response to the present state of the art, and in particular, in response to these and other problems and needs that have not been fully or completely solved by currently available adapters for connecting computer modems to a telephone line via a telephone set. Thus, it is an overall object of the present invention to provide an apparatus, system and method for reliably connecting and for interfacing a communication device, such as a computer modem, with a telephone line so as to provide for data or voice communications on the single line.

Another object of the present invention is to provide a connection system and method which allows a communication device to be connected to a PBX controlled telephone line.

It is another object of the present invention to provide a connection system and method which allows a communication device to be connected to a telephone line via varying types of telephone sets.

Yet another object of the present invention is to provide a connection system and method which utilizes a minimum number of circuit components, thereby resulting in a connection system which is reliable, inexpensive, small in size, and conducive for use with portable computers and modems.

A further object of the present invention is to provide a connection system which is programmably monitored and controlled, and therefore easy to use.

These and other objects and features of the present invention will become more fully apparent from the following description and appended claims, or may be learned by the practice of the invention as set forth hereinafter.

Briefly summarized, the foregoing and other objects are achieved with a novel and improved apparatus, system and method for connecting and for interfacing a communication device, such as a computer modem, to a two-wire telephone line via an existing telephone set, thereby allowing for data or voice communications on the single telephone line. In one preferred embodiment, the present invention includes an interface circuit, disposed within an interface adapter, for connecting the modem to the telephone set. The interface circuit preferably includes a four-wire handset connector jack for connecting to the handset portion of a standard telephone set, which includes a pair of handset transmitting wires (i.e., microphone lines) and the pair of handset receiving wires (i.e., speaker lines). Also included on the interface circuit is a four-wire base connector jack for connecting directly to the four-wire handset jack that is mounted on the telephone base (and which ordinarily receives the handset) via a four-wire base interconnect cable. Finally, the interface circuit in a preferred embodiment includes a data jack for connecting directly to the modem via a communication device interconnect cable. Thus, in one preferred embodiment the modem, the telephone handset, and the telephone base are all simultaneously coupled into the interface circuit.

A modem (or similar communication device) typically has a single pair of communication leads or wires, often referred to as the tip and ring lines, that match up with a corresponding pair of leads in a telephone line. However, in a preferred embodiment of the connection system of the present invention the modem is provided with a pair of transmitting wires and a pair of receiving wires that correspond directly with the four wires present within the handset connector jack of the telephone base. Thus, when in a data transmission mode, the interface circuit directly connects the two pairs of wires within the modem to the corresponding two pairs of wires within the telephone base/handset connector. In this way, there is no need for the interface circuit to provide a two-wire to four-wire conversion when transmitting a data signal, or a four-wire to two-wire conversion when receiving a data signal. Rather, as is well known, the telephone base, which is connected to the two-wire telephone line, performs the necessary signal conversions. Thus, in a preferred embodiment, the circuitry within the interface adapter utilizes few circuit components, is inexpensive and reliable, can be implemented in an extremely small physical space, does not require an external power supply, and results in an adapter that is generally less complex than interface adapters previously available.

To switch between a voice mode and a data mode state, the interface circuit portion of the connection system preferably includes a relay means. Preferably, the relay means automatically switches between the voice mode and the data mode, depending on the manner by which the single phone line is to be utilized. Thus, when in a voice mode state, the relay means causes the pair of handset transmitting wires and the pair of handset receiving wires to be electrically coupled directly to the corresponding pair of base transmitting wires and base receiving wires, and the telephone base and handset can be used for normal voice communication. Conversely, when in the data mode state, the relay means functions so as to electrically couple the pair of modem transmitting wires and the pair of modem receiving wires with the corresponding pair of base transmitting wires and base receiving wires. In this state, the modem can transmit and receive data signals to the telephone line via the interface adapter.

In another preferred embodiment, the present invention includes an interface circuit, disposed within an interface adapter, for connecting the modem to the telephone set. The interface circuit preferably includes a four-wire base connector jack for connecting directly to the four-wire handset jack that is mounted on the telephone base which ordinarily receives the four-wire base interconnect cable between the telephone base and the handset. Finally, the interface circuit in the present embodiment includes a data jack for connecting directly to the modem. In the present embodiment, only the telephone base, and not the handset, interfaces with the modem The data jack for connecting directly to the modem is configured for compatibility with a wireless or cellular interface located on the modem Traditional cellular or wireless interfaces are comprised of single-ended transmit and receive signals. Also included within the interface circuit are single-ended converters for compatibly interfacing the cellular or wireless interface of the modem with the four-wire telephone base jack.

In a preferred embodiment, the connection system also includes a cable detector function. The cable detector comprises circuitry that detects whether the modem is electrically connected to the interface adapter circuitry. Preferably, the cable detector circuitry generates a cable detection signal, the status of which can then be monitored by the communications software that is being executed on the host computer that is coupled to the modem. In this way, the connection status of the modem is programmable monitored, thereby allowing the host computer to automatically initiate and prompt the modem user to use the proper sequence for establishing a data communications link. This simplifies the overall operation of the connection system.

In a preferred embodiment, the interface adapter is utilized in conjunction with a host computer, which is operatively coupled to the modem or a similar communications device. Typically, the host computer includes a computer input device, such as a keyboard and/or a pointing device, a computer display and a programmable host processor. In use, a modem typically transmits signals to the telephone line that have a fixed voltage level, or transmit volume. However, when connected to a telephone base, the modem must adjust the transmit volume so that it conforms with the operating characteristics of the phone base, which can vary from type to type. To address this need, in one preferred method of the present invention, the programmable host processor is programmed so as to cause a communication processor located on the modem to transmit outgoing data signals at a preselected voltage level (i.e., transmit volume) that corresponds to the particular type of telephone base being used. In one embodiment, this preselected voltage level corresponds to a selection made by the user from a menu of telephone set types that are displayed on the computer's display. This approach eliminates the need for a manual switch and corresponding circuit arrangement for selecting a voltage level for outgoing data signals. Further, because it is done programmably, the amplitude of the transmit signal can be adjusted very precisely so as to match exactly the requirements of the particular telephone set, thereby insuring the accuracy of the outgoing transmit data.

In yet another preferred embodiment of the present invention, the transmit volume level used by the modem to transmit outgoing data signals is automatically calculated for the particular telephone set being used, thereby eliminating the need for any user intervention. Under this approach, the programmable host processor is programmed so as to cause the appropriate executable instructions to be invoked at the modem communication processor that function so as to automatically determine the optimum transmit level to be used for the particular telephone set being used. Preferably, this is accomplished by sending a transmit signal to the telephone base, and then monitoring the resulting receive signal via the telephone base sideband frequency. The amplitude (volume or gain level) of the transmit signal is then increased by iterative amounts, until the signal on the receive line is distorted or of unacceptable quality, i.e., thereby indicating that the telephone base amplifier has started to clip the signal and the volume level is too high for that particular telephone set. At this point, the amplitude level of the last used transmit signal is reduced by a predetermined amount, and the new value is deemed to be the optimum transmit level volume for that particular telephone set.

By utilizing the preferred program method of the present invention, the series of steps that a computer user is to follow when establishing a data communications link via a telephone base are displayed on the computer display, and thereafter monitored and controlled via the programmable host processor. This simplifies the overall connection process, and enables a user to establish a data communication link in a quicker and less confusing manner.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The following invention is described by referring to functional diagrams, schematic diagrams and functional flow diagrams and program flow charts to illustrate either the structure or processing of preferred embodiments used to implement the apparatus, system and method of the present invention. Using the diagrams in this manner to present the invention should not be construed as limiting of its scope.

The present invention contemplates both methods and systems for connecting and interfacing a communications device, such as a modem, to a telephone line via a telephone base set. Embodiments of the present invention may include a special purpose or general purpose computer comprising standard computer hardware such as a central processing unit (CPU) or other processing means for executing computer executable instructions, computer readable media for storing executable instructions, a display or other output means for displaying or outputting information, a keyboard or other input means for inputting information, and so forth.

Certain of the embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
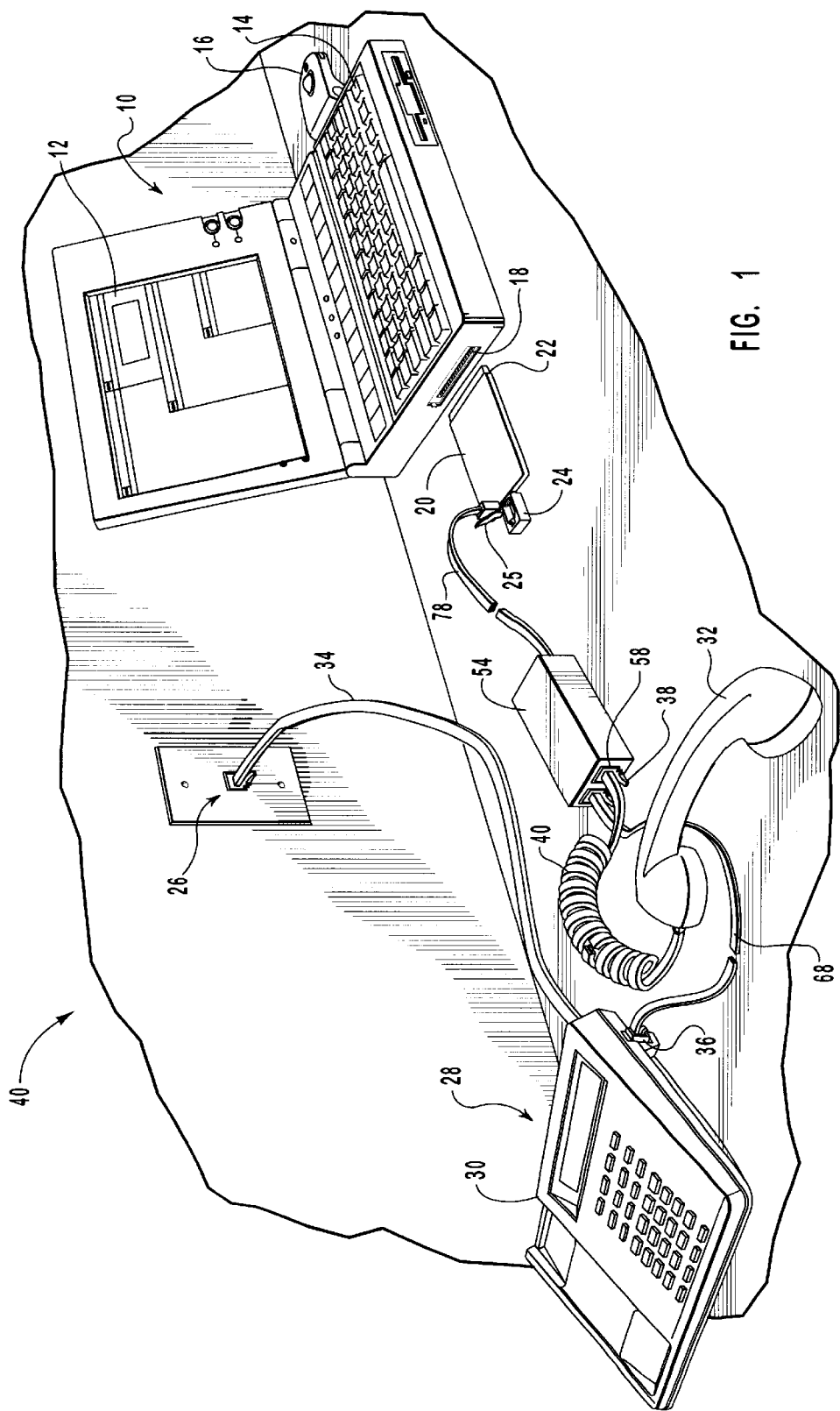
FIG. 1 is a perspective view of one environment in which the connection system and method of the present invention is to be utilized.
Figure 2:
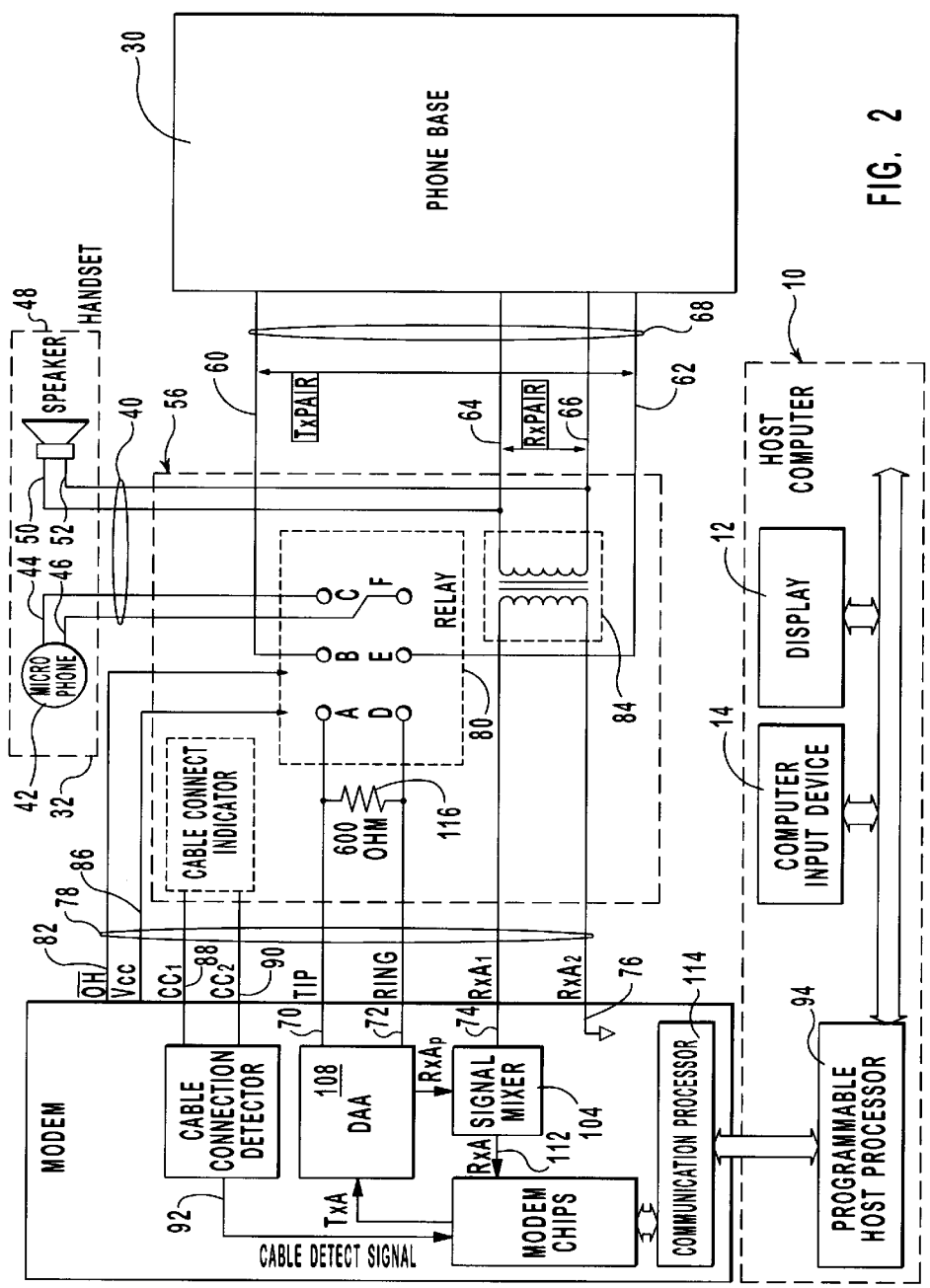
FIG. 2 is a functional block diagram illustrating one embodiment of the connection system of FIG. 1.
Figure 3:
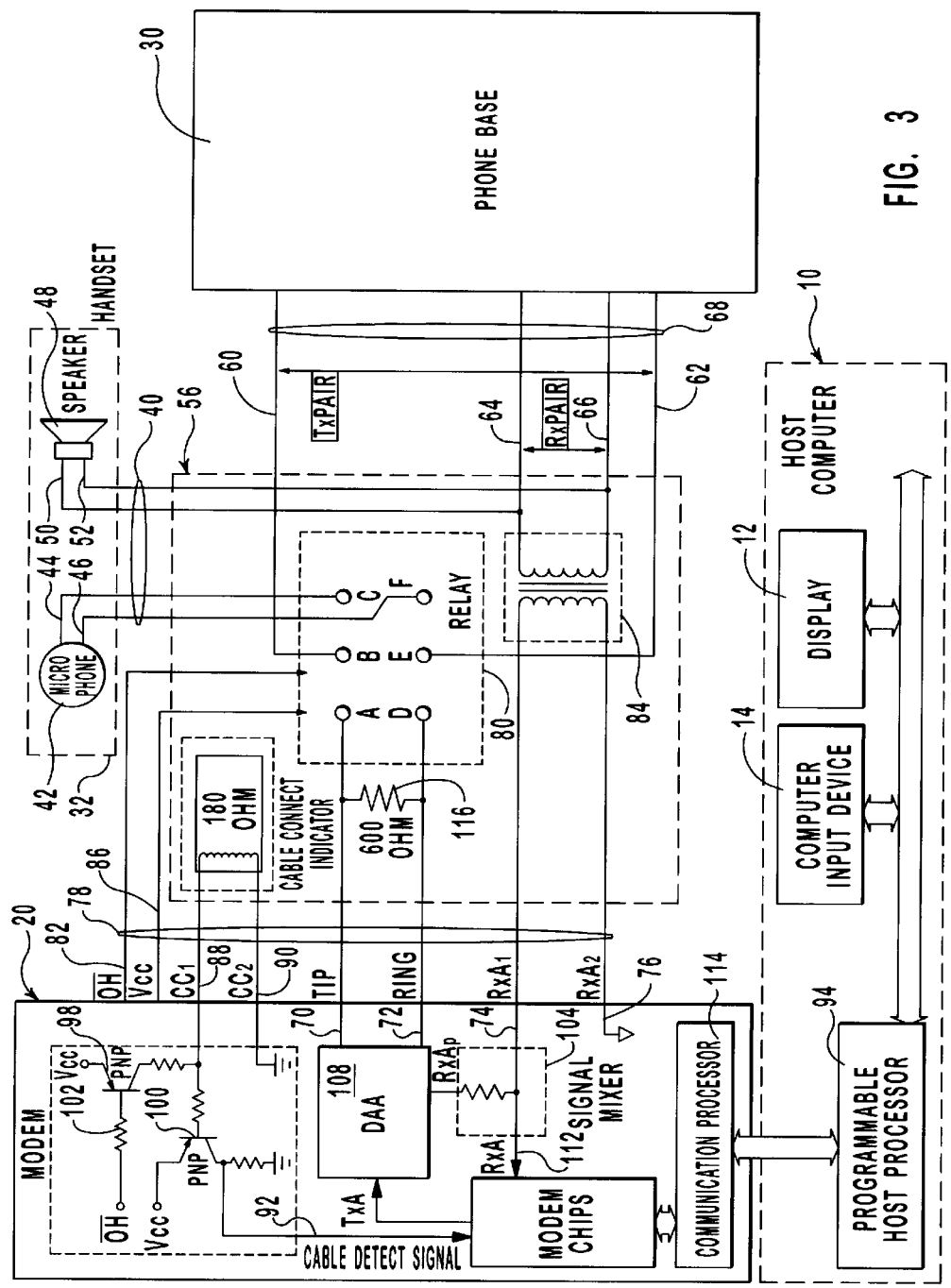
FIG. 3 is a schematic illustration of the connection system of FIG. 2.

Referring now to FIG. 1, illustrated is a typical environment in which the connection system and method of the present invention is used. A host computer, such as portable computer, designated generally at 10, is shown as comprising a computer display 12 and two computer input devices, keyboard 14 and pointing device 16. As is well known, the computer 10 also includes a disk drive, or some other standard storage device, capable of accessing computer readable media having executable instructions stored thereon. The portable computer is further comprised of a PCMCIA-architecture socket 18, into which is plugged a PCMCIA modem card illustrated and designated generally at 20. As is shown, modem card 20 is a standard PCMCIA card, having disposed therein a printed circuit board (not shown) onto which is placed the modem's various electrical components (the corresponding functional blocks of which are shown in FIGS. 2 and 3). Formed along one edge of the PCMCIA modem card is an edge connector 22, which is designed to be detachably received within a corresponding connector slot (not shown) disposed within the PCMCIA socket 18. In this way, the PCMCIA modem card 20 is operatively coupled with the portable computer 10, and may be used for communicating data via a telephone line.

Although FIG. 1 illustrates the connection system and method of the present invention as being used in conjunction with a PCMCIA modem and portable computer, it will be appreciated that the invention can also be used in conjunction with other, similar communications devices that require connection to telephone line. Further, the invention is not limited to use with portable computers, and may be used with other types of computer equipment.

Formed on one edge of the PCMCIA modem card is a standard RJ-type modular jack 24, which is designed to detachably receive a standard RJ-type modular plug 25 and telephone cable assembly. Under conventional circumstances, the opposite end of the cable is equipped with a modular plug, which can be detachably received within a corresponding RJ-11 modular telephone-jack 26, i.e., as would commonly be found on the wall of a home, office, etc. In this way, the modem can be interfaced directly with a standard two-wire telephone line.

As previously discussed, under certain conditions the modem cannot be connected directly to a dedicated two-wire telephone line. Under such circumstances, an embodiment of the present invention provides for a system and method for connecting and for interfacing a communication device, such as the PCMCIA modem 20 illustrated in FIG. 1, to a two-wire telephone line via a telephone set, which is designated generally as 28 in FIG. 1.

With continued reference to FIG. 1, telephone set 28 includes a telephone base 30 and a telephone handset portion 32. Telephone base 30 includes traditional dialing and receiving hardware, and is coupled, via a two wire line 34, to a two-wire telephone line through, for instance, a standard RJ-type modular wall jack 26. It will be appreciated that the two-wire telephone line can be connected directly to the public telephone network, or it can be connected to a PBX controller. Also, although the telephone set 28 is illustrated as being comprised of a separate base 30 and handset portion 32, it will be appreciated that the present invention can also be used in connection with a telephone set having an telephone base portion and telephone base portion which are formed as a single integral piece, as for example where the telephone is a wireless type phone.

Telephone base 30 also includes a modular telephone handset jack 36. When used for conventional voice only communications, the handset jack 36 detachably receives a modular handset plug 38, which is in turn connected to a handset cord 40. Connected to the opposite end of the handset cord 40 is the telephone handset 32, which includes a microphone 42 (FIG. 2), having a pair of transmit wires 44, 46 connected thereto, and a speaker 48 (FIG. 2), having a pair of receiving wires 50, 52 connected thereto.

In the embodiment illustrated in FIG. 1, the connection system includes an interface adapter 54. Disposed within adapter 54 is interface circuit 56, which will be described by making reference to FIGS. 2 and 3. Mounted at one end of the adapter 54 and electrically connected to the interface circuit 56, is a handset connector means for electrically receiving the pair of handset transmitting wires 44, 46 and the pair of handset receiving wires 50, 52 (shown in FIGS. 2 and 3). In the illustrated embodiment, handset connector means comprises a standard modular telephone handset jack 58 that detachably receives the handset plug 38 formed on the end of the handset cord 40.

Also connected at one end of the adapter 54 and electrically connected to the interface circuit 56 is a base connector means for electrically connecting to the pair of base transmitting wires 60, 62 (i.e., the microphone wires) and the pair of base receiving wires 64, 66 (i.e., the speaker wires) on the handset jack 36 that is formed in the telephone base 30 (and into which the handset cord 40 normally plugs). By way of example and not limitation, base connector means is comprised of a four-wire interconnecting cable 68, connected at one end to the adapter 54 and at the other end to the handset jack 36 of the telephone base 30. Preferably, the interconnecting cable 68 is connected to both the adapter 54 and the telephone base 30 by way of modular jack and plug arrangement, as is illustrated in FIG. 1.

Adapter 54 further has mounted thereon a communication device connector means, also electrically connected to the interface circuit 56, for electrically connecting the communication lines of the modem 20 to the adapter 54. As mentioned, a modem 20 utilizing the present connection system has four communications lines—a pair of communication device transmitting wires 70, 72 and a pair of communication device receiving wires 74, 76 (shown in FIGS. 2 and 3)—rather than the standard two communication lines. By way of illustration and not limitation, communication device connector means is comprised of a communication device interconnect cable 78, connected at one end to the adapter 54 and at the other to the modem 20. Preferably, the communication device interconnect cable 78 is connected to both the adapter 54 and the modem 20 by way of a modular jack and plug arrangement.

Although adapter 54 is illustrated in FIG. 1 as comprising a separate physical part, it will be appreciated that the adapter interface circuitry can be incorporated partially or completely within the host computer, or on the modem itself.

FIG. 2 illustrates in further detail a presently preferred embodiment of the connection system discussed in connection with FIG. 1. Disposed within the adapter is an interface circuit, designated generally at 56. The modem 20 is coupled to the interface circuit 56 by way of communication device interconnect cable 78. Similarly, the interface circuit 56 is coupled to the handset 32 via the handset plug 38 formed on the end of the handset cord 40, and to the telephone base 30 via the four-wire interconnecting cable 68.

As is further shown in FIG. 2, the modem 20 has available at the communication device interconnect cable 78 attachment four communications lines—a pair of communication device transmitting wires, otherwise referred to as the tip line 70 and the ring line 72, and a pair of communication device receiving wires, referred to as the $R_xA_1$ 74 and the $R_xA_2$ 76 lines. The tip 70 and the ring 72 lines correspond to the pair of transmitting wires provided on the telephone handset 32 (referred to as 44 and 46) and the transmitting wires provided on the telephone base 30 (referred to as 60 and 62). Similarly, the $R_xA_1$ 74 and the $R_xA_2$ 76 lines correspond to the pair of receiving wires 50, 52 on the handset 32 and 64, 66 on the telephone base 30.

Interface circuit 56 further comprises a relay means, as for example relay 80, for automatically switching between a voice mode state and a data mode state. In the voice mode state, nodes C and B are electrically connected and nodes F and E are electrically connected. Thus, the pair of handset transmitting wires 44, 46 and the pair of handset receiving wires 50, 52 are electrically connected to the corresponding pair of base transmitting wires 60, 62 and base receiving wires 64, 66. Nodes A and D are left unconnected, thereby electrically isolating the modem. When in this state the telephone set 28 can be used for normal voice communications.

Conversely, when in the data mode state, nodes A and B, and nodes D and E are electrically connected. Thus, the pair of communication device transmitting wires 70, 72 and the pair of communication device receiving wires 74, 76 are electrically connected to the corresponding pair of base transmitting wires 60, 62 and base receiving wires 64, 66. Nodes C and F are left open, thereby electrically isolating the microphone portion 42 of the telephone handset 32 and preventing any voice communications. This enables the modem to send and receive data via the telephone set 28.

Relay 80 can be implemented by using a variety of switching devices, as will be appreciated by one of skill in the art. In one preferred embodiment, relay 80 is implemented with a two-position TQ-relay manufactured by Aromat, and known by the part number E57521.

In one preferred embodiment, the relay 80 automatically switches between the data mode and the voice mode states depending on the status of the Off-Hook signal (OH) that is generated by the modem 20 and connected at the selection input of relay 80. The Off-Hook signal is connected to the interface circuit 56 via the communication device interconnect cable 78 on the OH line 82. Thus, when OH is set to a zero voltage level (binary 0), indicating that the modem 20 is ready to transmit, the relay 80 will switch to a data mode state. When OH is set to a high voltage level (binary 1), the modem 20 is not transmitting and the relay 80 will switch to a voice mode state. It will be appreciated that a signal other than OH could be used to switch between the data mode and voice mode states. An advantage of this automatic switching arrangement is that there is no a need for a manual switch and corresponding circuit arrangement, which reduced the number of components required in the interface circuit 56. Of course, under some circumstances a manual switching arrangement may be used.

As will be further appreciated from FIG. 2, when in the data mode state, the four communication lines provided on modem 20 are coupled directly to the corresponding four communication wires provided in the telephone base 30. More specifically, the tip 70 and the ring 72 lines are connected directly to the pair of base transmitting wires 60 and 62, and the $R_xA_1$ 74 and the $R_xA_2$ 76 lines are connected to the pair of base 30 receiving wires 64, 66. To insure a proper ground isolation between the modem 20 and the telephone base 30, the $R_xA_1$ 74 and the $R_xA_2$ 76 lines are interconnected with the pair of receiving wires 64, 66 by way of a coupling transformer 84, and the $R_xA_2$ 76 line is then tied to ground at the modem 20. Although any one of a variety of coupling transformers, or equivalent circuits can be used, one preferred modem coupling transformer 84 is available from a company called Midcom, and is known by the part number 671-8255.

By providing a four-wire to four-wire connection, interface circuit 56 does not need to perform a four-wire to two-wire signal conversion. Rather, the standard electronics contained within the telephone base 30 performs the required signal conversions for interfacing with the two-wire telephone line. Again, this reduces the number of circuit components contained within interface circuit 56, further reduces its complexity, and allows the interface adapter 54 to be extremely small in size. Further, a separate and independent power source is not required because, as is shown in FIG. 2, power is supplied to the interface circuit from modem 20 via a $V_{cc}$ line 86 contained within the communication device interconnect cable 78.

With continued reference to FIG. 2, it is further illustrated how in the preferred embodiment, an impedance matching resistor 116 is placed across the pair of transmit 70, 72 lines within the interface circuit 56. This insures proper impedance matching so as to prevent wave reflections and other associated problems, as are well known in the art. A preferred resistance value is 600 Ohms, which value could be varied depending on the particular operating environment.

FIG. 2 also shows that in a preferred embodiment, the connection system of the present invention further includes a cable detector means for detecting whether the modem 20 is electrically connected to the interface circuit 56. Cable detector means preferably comprises an indicator circuit means, disposed on the interface circuit 56, for generating a cable connection signal via lines 88 and 90; and a detection circuit means, disposed on the modem 20 and responsive to the cable connection signal. The detection circuit means, depending on the state of the cable connection signal, functions so as to generate a cable detect signal on line 92. The cable detect signal is indicative of whether the modem 20 is, or is not, connected to the interface circuit 56, and can be monitored by a programmable host processor 94, as is discussed in further detail below.

By way of example and not limitation, FIG. 3 illustrates how the indicator circuit means is comprised of a connection indication circuit that includes, for example, a 180 Ohm relay coil 96. One node of the relay coil 96 is connected to line 88 disposed within the communication device interconnect cable 78, and generates a first portion of the cable connection signal CC1. The other node of the relay coil is also connected to a separate line 90 within the interconnect cable 78, and generates a second portion of the cable connection signal CC2.

When connected to modem 20, the CC1 and CC2 lines 88, 90 are electrically connected to the cable connection detector means, which is comprised of a connection detection circuit that includes, for example, a pair of PNP transistors 98, and 100, connected as shown, with the CC2 portion of the cable connection signal connected to ground. Thus, with the base of the first transistor 98 connected, through resistor 102, to the Off-Hook signal line 82 (discussed above), the cable detect line 92, which is connected to the collector of the second transistor 100, will be high (5 volts) when the modem 20 is taken off-hook. This signifies that the communication device interconnect cable 78 is connected between the interface circuit 56 and the modem 20. Conversely, if the cable detect line 92 is low (ground) while the off-hook line is asserted, then the communication device interconnect cable 78 is not connected between the interface circuit 56 and the modem 20.

As discussed generally, when connected to the telephone base 30 via interface adapter 54, the modem 20 acts as a 4-wire communication device. In this state, the signal mixer 104, shown in FIG. 3 as being comprised of a single resistor 106 placed in series with the DAA circuit block 108 and the Modem chip set 110, insures that the incoming data signals $R_xA$ supplied to the modem chip set 110 are derived solely from the incoming pair of receiving lines $R_xA_1$ 74 and $R_xA_2$ 76 that are received from the telephone base 30. In contrast, in the event that the modem is connected directly to a two-line telephone line and not via the interface circuit 56 and telephone set 28, the modem 20 will act as a conventional two-wire communication device. In this state, incoming data signals $R_xA$ 112 will be derived solely from the signals that are present on the tip 70 and the ring 72 lines in a manner well known in the art by way of the conventional DAA circuitry 108 that is present on the modem 20.

With continued reference to FIGS. 2 and 3 together, it is illustrated how the modem 20 includes, typically as part of a standard modem chip set, a programmable communications processor 114. In the preferred embodiment, the communications processor 114 is comprised of a microcontroller, which is used to perform the PCMCIA modem's general command processing functions and the host computer interface functions. A preferred microcontroller is available as part of a chip-set manufactured and sold by Rockwell Corporation and known as the RC96ACL/RC144ACL integrated data/fax/voice modem device set family. This microcontroller is more particularly known as a Rockwell C29 or C39 microcomputer. It will be appreciated that various other digital microprocessors, which are well known in the art, could also be used.

As previously mentioned, the connection system of the present invention further includes a host computer, such as portable computer 10. Portable computer comprises a computer display 12 and two computer input devices, keyboard 14 and pointing device 16. As is well known, portable computers of this type also include a programmable host processor 94, which is interfaced with the PCMCIA modem 20, and the components thereon, via the PCMCIA-architecture socket bus (not shown).

Figure 4:
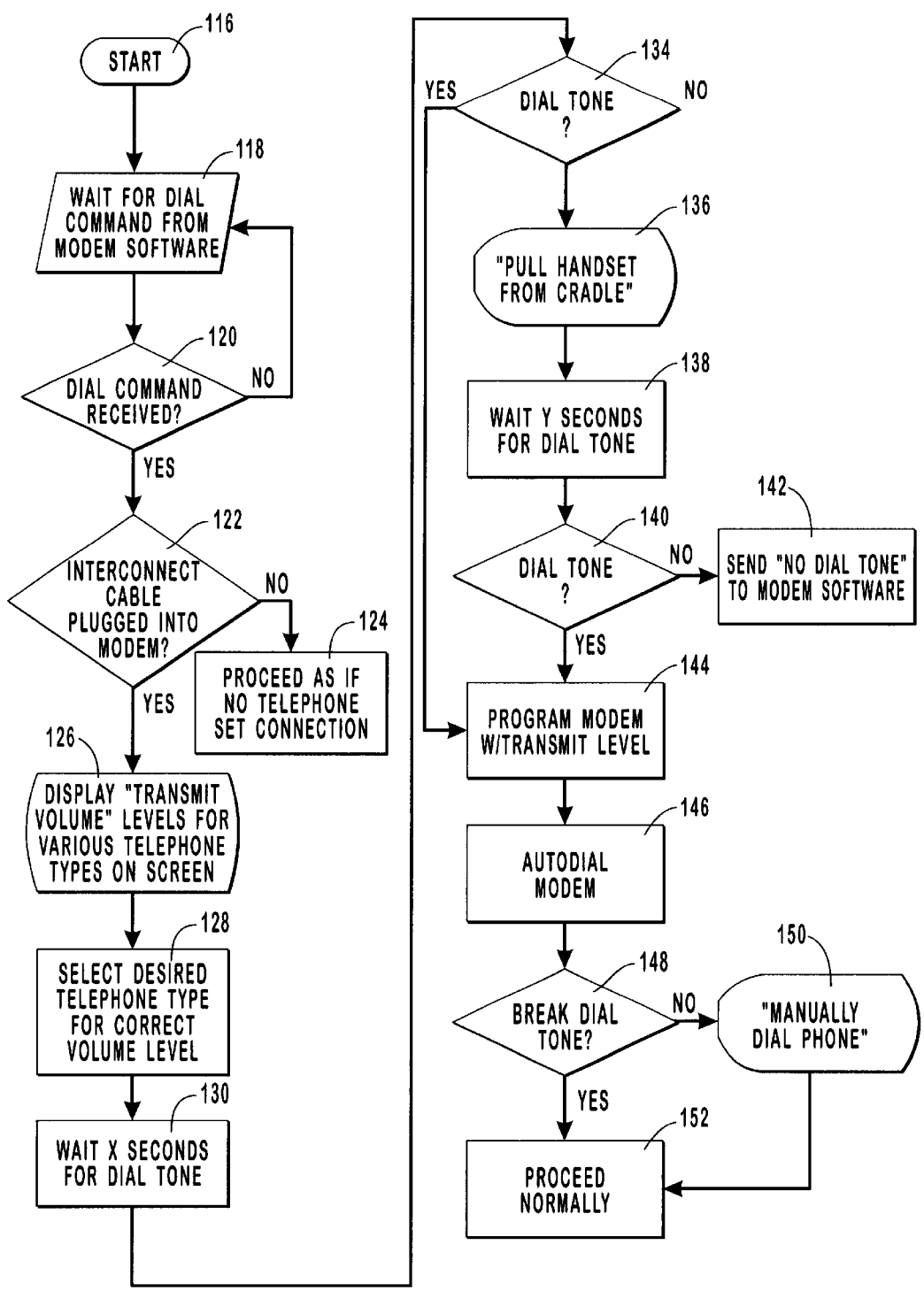
FIG. 4 is a program flow chart illustrating one presently preferred program method of the invention.

Reference is next made to FIG. 4, which is a flow chart illustrating one example of a preferred embodiment of the program steps used for programming the programmable host processor 94, and the communications processor 114. As is well known, there are presently a large number of commercially available communications software packages which control the setup, operation and dialing of modems. Preferably, the method illustrated in FIG. 4 is implemented, using well known programming techniques, as an add-on to one of the pre-existing software packages. For instance, a hot-key combination will initiate a window on the computer display 12 in which will be executed the program method of FIG. 4.

Beginning at program step 116 in FIG. 4, the program is initiated at host processor 94, as for instance via the hot-key combination mentioned. At step 118, a series of instructions execute that function so as to wait for a dial command to be issued to the modem 20 via the communications software, which is also being executed on the programmable host processor 94. Once a dial command has been detected at step 120, the host processor 94 will proceed to step 122. There, the host processor 94 will query the communications processor 114, which is monitoring the cable detect signal 92 discussed above. If the cable detect signal 92 is not asserted, modem 20 is not connected to a telephone line via the interface circuit 56, and the communications processor 114 will exit to the communications software package and proceed normally, as is indicated at step 124.

If the cable detect signal 92 is asserted, then the modem 20 is connected to the interface circuit 56. In the preferred embodiment, a series of executable instructions will then be performed that function so as to set the optimum transmit level for the particular telephone set. By way of example, these executable instructions are represented in FIG. 4 at program steps 126 and 128. At program step 126 the host processor causes a list of telephone set types to be displayed to the user on the computer display 12, and requests that the user select the specific model number of the telephone set that is being used. At step 128, the user will make the appropriate selection via the computer input device, such as keyboard 14 or pointing device 16. The corresponding transmit level for the selected telephone will then be used as the optimum level.

After proceeding next to step 130, the host processor 94 will wait a predetermined amount of time and then check for a dial tone from the telephone set 28 at step 134. If a dial tone is not present, the processor 94 will cause a message to be displayed on the computer display 12 informing the user to remove the telephone handset 32 from the telephone base 30 cradle. After displaying the message, the processor 94 will again wait for a predetermined amount of time at step 138 before again checking for the existence of a dial tone at step 140. If at that time no dial tone is present, a "no dial tone" error message is sent to the modem communications software running on the host processor 94 at step 142, so that the user can resolve the problem.

If at either step 134 or 140 a dial tone is detected, the processor 94 will proceed to step 144 and cause the communications processor 114 to thereafter transmit signals having the optimum voltage amplitude (i.e., volume transmit level or gain) that corresponds to the phone type selected at step 128. It will be appreciated that by allowing the modem 20 communication processor 114 to preset the voltage of the data signal, there is no need for the interface circuit 56 to have a manual switch and corresponding circuit arrangement to provide the function. This further eliminates the circuitry that is required in the circuit interface 56. Further, by selecting the exact phone type at step 128, the resulting voltage amplitude matches exactly that which is required by the particular telephone set. This assures that the voltage level is correct, and insures the accuracy of the outgoing data signal.

After having set the modem's volume-transmit voltage level to the appropriate level at step 144, in a preferred embodiment the host processor 94 next proceeds to program step 146 the communications software autodials the modem 20 with a prestored/preselected phone number. The processor 94 then checks, at program step 148, whether the dial tone has been broken. If not, the processor 94 will cause a message to be displayed on the computer display 12, informing the user that this particular phone cannot be autodialed, and must be manually dialed by the user. If at step 148 it is detected that the dial tone has been broken, then the modem 20 has successfully accessed the phone line via the telephone set 28, and data communications will proceed as intended, as is indicated at step 152.

Figure 5A:
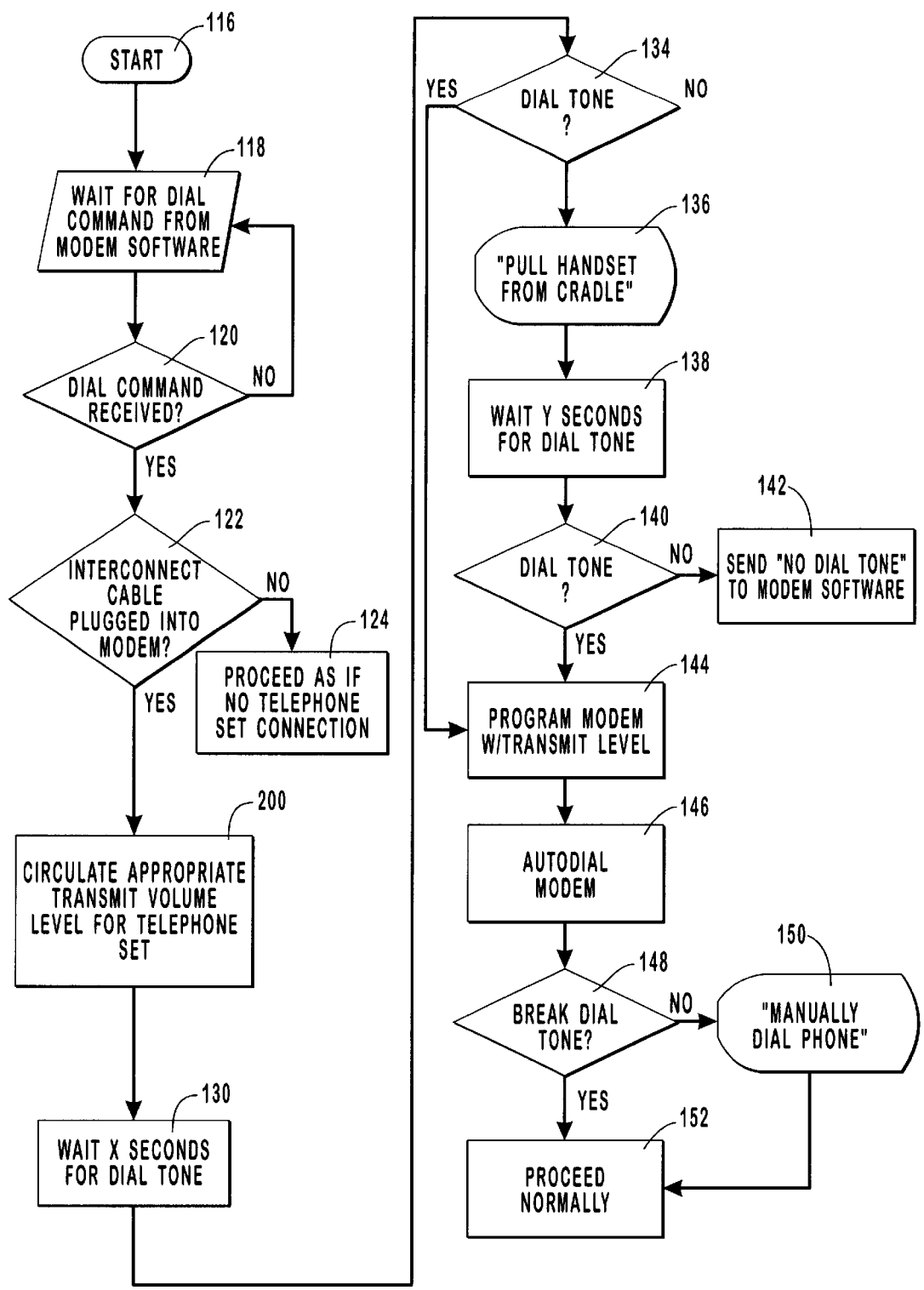
FIGS. 5A and 5B are program flow charts illustrating another presently preferred program method of the invention.
Figure 5B:
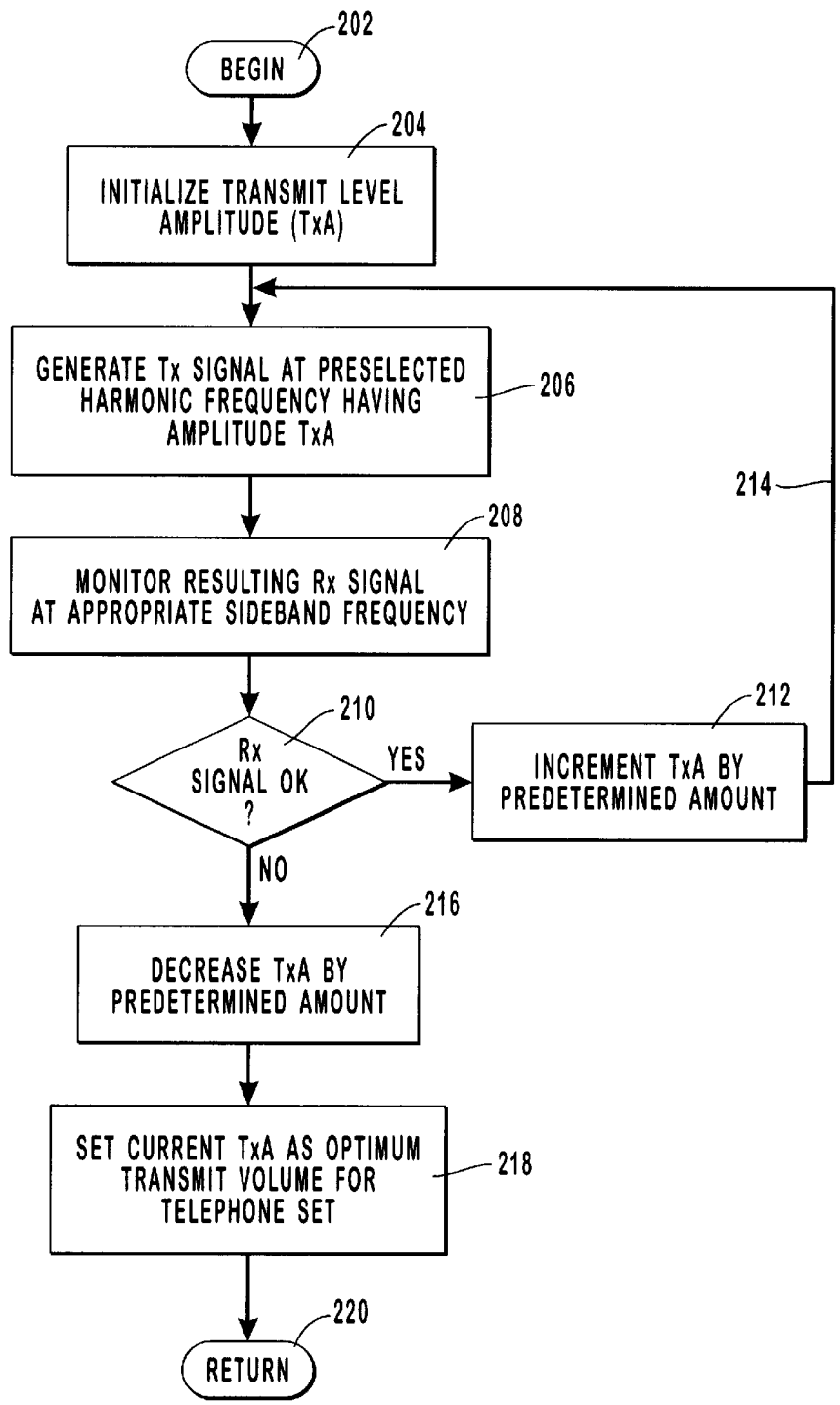

Reference is next made to FIGS. 5A and 5B, which together illustrate an alternative embodiment of a program method for programming the programmable host processor 94 and the communications processor 114. FIG. 5A is identical in all respects to the program steps of FIG. 4 except for the process steps that correspond to the function of identifying the optimum transmit volume level of the modem for the particular telephone base being used. That particular function is indicated at program step 200; all other program steps are designated with the same reference numbers as used in FIG. 4, and a description of those functions will not be repeated here.

Program step 200 represents the executable instructions that function so as to automatically calculate the optimum transmit volume level for the telephone base connected to the interface circuit 56. One preferred method for performing this particular function is illustrated in FIG. 5B, to which reference is now made.

The series of executable instructions begins a program step 202 under the control of programmable host processor 94. The host processor 94 then proceeds to step 204, where the processor 204 initializes a variable, referred to as the Transmit Level Amplitude $T_xA$. This value corresponds to an initial transmit volume level to be used by the modem in connection with the particular telephone base then in use, so as to ascertain the optimum level for that telephone. Preferably, the initial value will be relatively low.

Having initialized the $T_xA$ value, the host processor 94 proceeds to program step 206, and passes the initial value to the communications processor 114 present on the modem 20. At program step 206, the communications processor 114 generates, via the processor's 114 DSP (digital signal processor) component, a test signal, preferably in the form of a sine wave, having an amplitude equal to the $T_xA$ value. This test signal is then sent to the telephone base as a transmit signal via the base transmitting wires 60, 62. Also, the signal is generated at an appropriate harmonic frequency, such as for example, 345 Hz.

While the test signal is being transmitted to the telephone base 30, the communications processor 114 proceeds to program step 208, where it monitors the signal being received from the telephone base, via the base receiving wires 64, 66 on the telephone's. Again, the received signal is monitored at an appropriate harmonic frequency, such as for example 690 Hz. The quality of the signal is evaluated via the DSP component of the communications processor 114 in a manner so as to ensure that the received signal has not been clipped, or otherwise distorted by the telephone base 30 amplifier circuitry. This would indicate that the $T_xA$ value is too high for the particular telephone being used. Of course, if the initial value of $T_xA$ is too high, then a lower value will have to be used at the initialization step at program step 204.

The communications processor 114 then proceeds to step 210, wherein it is determined whether the $T_xA$ value being used for the transmit signal results in a distorted/clipped or otherwise unacceptable receive signal. If not, then the processor 114 proceeds to program step 212, and increments the value of $T_xA$ by an incremental amount. The processor 114 then returns to program step 206, and a new transmit signal is generated which has an amplitude corresponding the new $T_xA$ value. Again, the resulting receive signal is evaluated so as to determined if its own amplitude has increased by an amount proportional to the increase in amplitude of the transmit test signal, without distortion or clipping. This process is then repeated in an interactive fashion, until the point is reached at program step 210 where it is determined that the transmit test signal has an amplitude $T_xA$ that results in a receive signal that is distorted or clipped by the amplifier of the telephone base 30. When this occurs, the processor 114 proceeds to program step 216. At this step, the last used value for $T_xA$ is decreased by a predetermined amount, such as for example, by about 12 dB. This new value is then deemed to be the optimum transmit level for the particular telephone base 30, and is the value subsequently used by the mode for this base 30, as is indicated at program step 218. The communications processor 114 then returns control to the host processor 94, which then returns, at program step 220, to the main program flow illustrated in FIG. 5A. Having calculated the optimum transmit level for the telephone base 30, processing then continues at program step 130 in FIG. 5A in the same manner as previously described in connection with FIG. 4.

By using the embodiment illustrated in FIGS. 5A and 5B, the transmit volume can be automatically calculated, without requiring any intervention by the computer/modem user. The process reduces the potential for mistakes, and also ensures that a broader number of different telephone types can be used in connection with the interface adapter 54.

It will be appreciated that by utilizing the program method of either FIG. 4 or FIGS. 5A and 5B, the initiation of data communications with the connection system of the present invention is greatly simplified. It insures that the user follows the necessary sequence, ensures that the modem is properly configured and optimized for the particular telephone set, and prompts the user if any error conditions exist. Thus, a data communication link can be established quickly.

Figure 6:
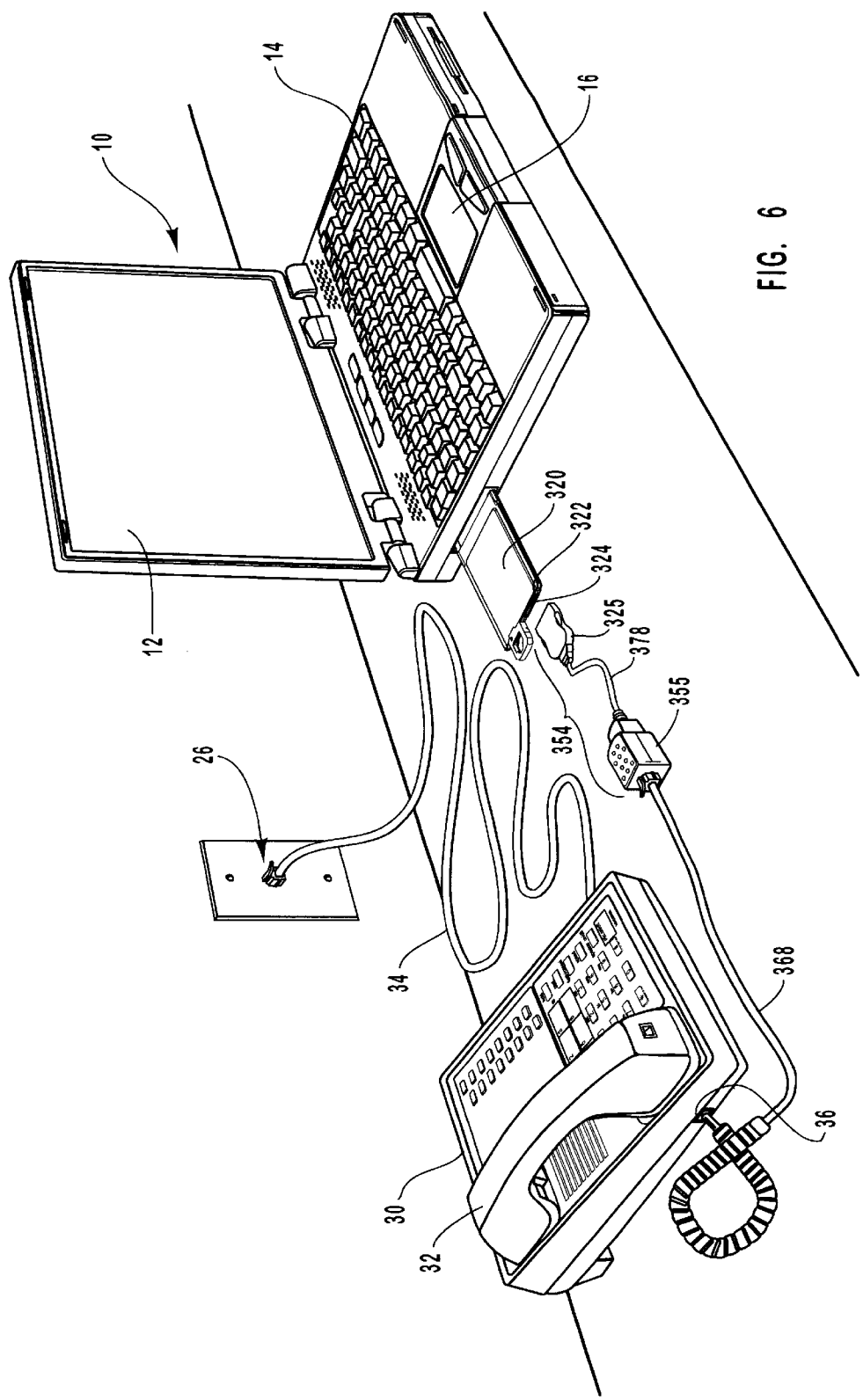
FIG. 6 is a perspective view of another environment in which the connection system and method of another embodiment of the present invention is to be utilized.

Referring now to FIG. 6, illustrated is a typical environment in which the connection system and method of the present embodiment of the present invention is used. Like other embodiments, a host computer, such as a portable computer, is also employed. The present embodiment employees a PCMCIA modem card illustrated and designated generally as 320 which incorporates an interface 322 which makes digital information generally available. Such an interface may take the form of a digital interface for coupling to other devices such as a wireless transceiver, such as a cellular or PCS interface device. By way of example, a digital interface is illustrated as having a jack or connector such as cellular jack 324 for providing external accessibility to the digital interface signals. By way of example, one such cellular interface may be comprised of signals such as power (e.g., Vcc), ground, and a transmit and a receive signal. Additional signals may be incorporated such as those relating to the cable connector indicator functionality described above.

An interface adapter 354 provides the electrical and mechanical coupling between modem 320 and phone base 30. Interface adapter 354 is comprised of a base connector means for interconnecting with the four-wire interface of base 30. By way of example and not limitation, base connector means is comprised of a base connector 355 for electrically receiving therein interconnecting cable 368.

Interface adapter 354 is further comprised of cable 378 and a communication digital interface connector 325 for electrically interfacing with a digital interfacing of modem 320. As interface adapter 354 must convert between the four-wire interface as presented by base 30 into a single-end transmit and receive interface of interface 322, interface adapter 354 must also be comprised of an interface circuit capable of electrically converting the signals.

Figure 7:
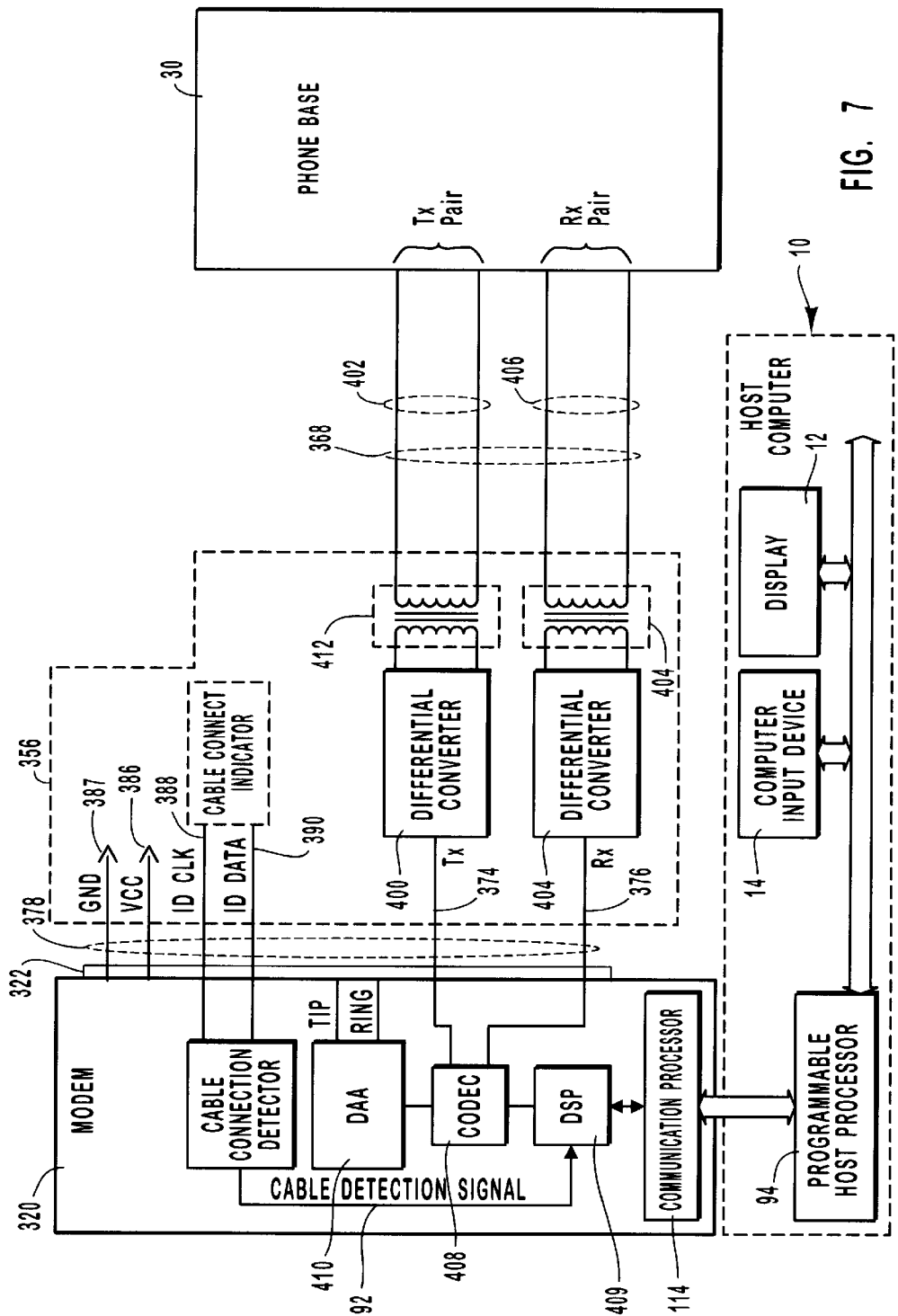
FIG. 7 is a functional block diagram illustrating another embodiment of the connection system of FIG. 6.

FIG. 7 illustrates in further detail the preferred embodiment of the connection system discussed in connection with FIG. 6. Disposed within the interface adapter is an interface circuit, designated generally as 356. The modem 320 is coupled to the interface circuit 356 by way of an interconnect cable 378 which is preferably part of an integrated interface assembly thereby simplifying the process of interfacing modem 320 with phone base 30. Similarly, the interface circuit 356 is coupled to the telephone base 30 via the four-wire interconnecting cable 368, which may preferably be the coiled handset cable which traditionally connects the handset of the telephone with the base portion of the telephone.

FIG. 7 further depicts the modem 320 having a digital interface 322 such as a wireless or cellular interface for attaching to and interacting through interconnection cable 378. While various digital interface embodiments may be imagined, one such interface is comprised of a power and ground signal for providing power e.g., Vcc 386 and ground 387, a transmit signal 374 and a receive signal 376. As described above, additional signals such as identification clock 388 and identification data 390 may also be employed for the purpose of identifying a specific cable coupled to the digital interface thereby allowing specific operational configuration of the modem's digital interface 322.

Interface circuit 356 further comprises a conversion means for converting the single ended transmit signal 374 into a double ended transmit pair for compatible use by the four-wire interface of phone base 30. By way of example, a differential converter 400 transforms a single ended transmit signal 374 into a differential transmit pair compatible with the four-wire PBX interface, two wires of which form transmit pair 402. Similarly, a converter means 404 converts the received pair 406 from the phone base 30 and converts the differential signals into receive signal 376.

One of the particular advantages of the present invention is that the digital interface on modem 320 taps the transmit and receive lines at the outputs of CODEC 408 prior to the transmit and receive signals being transferred to DAA 410. Those skilled in the art appreciate that when employing "line-side" circuitry, such as that included in interface circuit 356, power must be made available to the circuitry within the line-side components. Those skilled in the art appreciate that traditional interfaces exist for coupling a traditional modem with a PSTN system wherein power from the tip and ring signals may be utilized for powering any interface circuitry. However, a PBX system is incapable of supplying sufficient power for operating line-side interface circuitry. Therefore, the present invention provides power and ground through the digital interface, such as a wireless or cellular interface, for powering the interface circuitry.

Those skilled in the art appreciate that such an approach removes the need to terminate the transmit and receive signals which removes some of the losses in the system. Furthermore, noise and other anomalies injected into the transmit and receive signals by a DAA 410 are avoided by tapping the transmit and receive signals directly following the CODEC 408. While isolation is still required between the modem and telephone equipment, such isolation may be provided through the use of transformers depicted as transformers 412 and 414.

Figure 8:
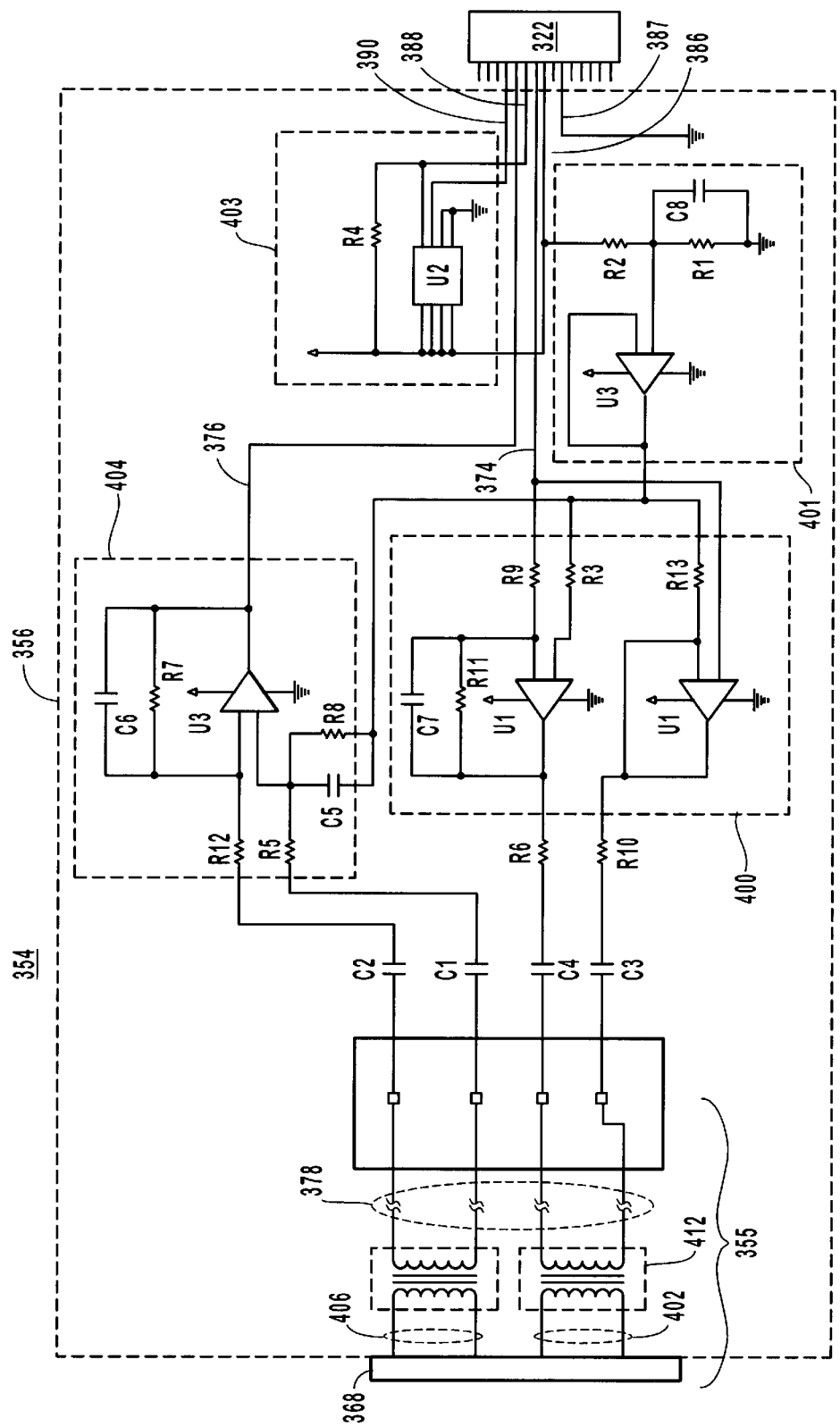
FIG. 8 is a schematic illustration of the connection system of FIG. 7.

FIG. 8 depicts a schematic diagram of interface circuitry 356.

Interface adapter 354 is comprised of interface circuit 356 which, in the preferred embodiment, is generally physically housed within digital interface connector 325 (FIG. 6), cable 378, and base connector 355 (FIG. 6). As described above, digital interface 322 from modem 320 provides digital signals such as Vcc 386, ground 387, cable connect indicator clock 388 and data 390. Digital interface 322 is further comprised of receive signal 376 and transmit signal 374. Interface circuit 356 is comprised of five major functional components, cable connect indicator circuit 403, reference circuit 401, converter circuit 400, converter circuit 404, and transformers 412 and 414. Cable connect indicator circuit 403 has been described above and is preferably comprised of a serial memory device having a programmed numerical sequence for distinctly identifying interface adapter 354.

Interface circuit 356 is comprised of converters 400 and 404 which perform single-ended to double-ended conversion and double-ended to single-ended conversion, respectively. As described above, the digital or cellular interface 322 provides digital signals in a single-ended nature. Likewise, digital interface 322 receives digital signals in a single-ended manner. Therefore, converter 400 receives a transmit signal 374 and, in conjunction with a reference generated by reference circuit 401 converts the single-ended transmit signal into double ended base transmitting signals 402. Similarly, converter 404 receives double-ended base receiving signals 406 and, in conjunction with a reference signal generated by reference circuit 401 converts the double-ended receive signal to a single-ended receive signal 376 for presentation to digital interface 322. Converter circuits 400 and 404, in the preferred embodiment, are comprised of up amps such as TLC2272. Reference circuit 401, also in the preferred embodiment, is comprised of a similar up amp and biased, preferably, midway between Vcc and ground.

In the preferred embodiment, representative resistor and compasitor values are as follows: R1=20k, R2=20k, R3=1k, R4=3.09k, R5=15k, R6=20k, R7=15k, R8=15k, R9=10k, R10=20k, R11=10k, R12=15k, C1=1UF, C2=1UF, 3C=1UF, C4=1UF, C5=1500PF, C6=1500PF, C7=2200PF, and C8=1UF. Transformers 412 and 414 are comprised of devices such as 2786.

Figure 9:
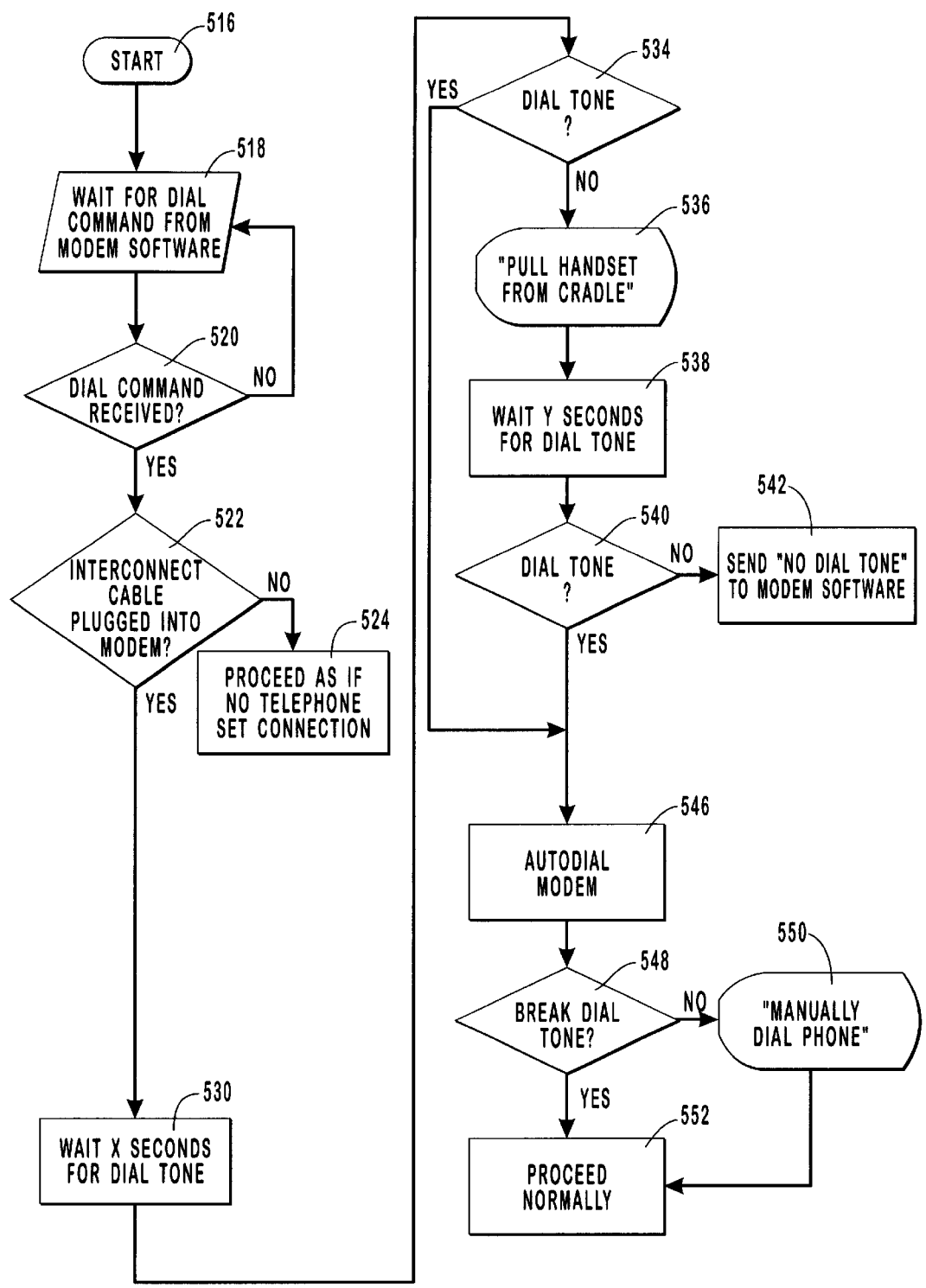
FIG. 9 is a program flow chart illustrating yet another presently preferred program method of the invention.

Reference is next made to FIG. 9, which is a flow chart illustrating one example of a preferred embodiment of the program steps used for programming the programmable host processor 94, and the communications processor 114. As is well known, there are presently a large number of commercially available communications software packages which control the setup, operation and dialing of modems. Preferably, the method illustrated in FIG. 9 is implemented, using well known programming techniques, as an add-on to one of the pre-existing software packages. For instance, a hot-key combination will initiate a window on the computer display 12 in which will be executed the program method of FIG. 9.

Beginning at program step 516 in FIG. 9, the program is initiated at host processor 94, as for instance via the hot-key combination mentioned. At step 518, a series of instructions execute that function so as to wait for a dial command to be issued to the modem 320 via the communications software, which is also being executed on the programmable host processor 94. Once a dial command has been detected at step 520, the host processor 94 will proceed to step 522. There, the host processor 94 will query the communications processor 114, which is monitoring the cable detect signal 92 discussed above. If the cable detect signal 92 is not asserted, modem 320 is not connected to a telephone line via the interface circuit 356, and the communications processor 114 will exit to the communications software package and proceed normally, as is indicated at step 524. If the cable detect signal 92 is asserted, then the modem 320 is connected to the interface circuit 356.

After proceeding next to step 530, the host processor 94 will wait a predetermined amount of time and then check for a dial tone from the telephone set 28 at step 534. If a dial tone is not present, the processor 94 will cause a message to be displayed in step 536 on the computer display 12 informing the user to remove the telephone handset 32 from the telephone base 30 cradle. After displaying the message, the processor 94 will again wait for a predetermined amount of time at step 538 before again checking for the existence of a dial tone at step 540. If at that time no dial tone is present, a "no dial tone" error message is sent to the modem communications software running on the host processor 94 at step 542, so that the user can resolve the problem.

If at either step 534 or 540 a dial tone is detected, the processor 94 will default to a transmit level, and in the present preferred embodiment, the host processor 94 next proceeds to program step 546 the communications software autodials the modem 320 with a prestored/preselected phone number. The processor 94 then checks, at program step 548, whether the dial tone has been broken. If not, the processor 94 will cause a message to be displayed on the computer display 12, informing the user in step 550 that this particular phone cannot be autodialed, and must be manually dialed by the user. If at step 548 it is detected that the dial tone has been broken, then the modem 320 has successfully accessed the phone line via the telephone set 28, and data communications will proceed as intended, as is indicated at step 552.

In summary, the present invention is directed to a novel and improved system and method for connecting and interfacing a communications device to a telephone line via a telephone set. Importantly, the interface is accomplished by using a two-wire to four-wire interface, thereby eliminating unnecessary circuitry and complexity used for line termination and eliminating from a two-wire combined transmit and receive signal as present on a tip and ring signal. Further, when the connection system is used in conjunction with the disclosed programming methods, further circuitry is eliminated, a greater degree of reliability and ease of use is obtained. Finally, the process by which a data communication link is obtained is greatly simplified.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An interface adapter for interfacing a communication device with a telephone line via a telephone base, the interface adapter comprising:

a base connector capable of electrically connecting to a pair of base transmitting wires and a pair of base receiving wires present at the telephone base;

a digital interface connector capable of electrically interfacing with a plurality of digital signals generated at the communication device, the digital interface connector further including a single transmit signal on a transmitting wire and a single receive signal on a receiving wire; and an interface circuit that is capable of electrically converting the single transmit signal into a pair of transmit signals connected to the pair of base transmitting wires and a pair receive signals present on the pair of base receiving wires into the single receive signal.

2. An interface adapter as defined in claim 1, further comprising a connection indication circuit that generates a connection signal in the event that the communication device is electrically and operatively connected to the interface adapter.

3. An interface adapter as defined in claim 2, wherein the connection indication circuit comprises a resistive network that generates the connection signal in the event that the communication device is electrically interconnected with the interface adapter via a device interconnect cable.

4. An interface adapter as defined in claim 1, wherein the communication device comprises a connection detection circuit that is capable of detecting when the interface adapter is electrically and operatively connected to the communication device.

5. An interface adapter as defined in claim 1, wherein the digital interface connector is a wireless transceiver interface.

6. An interface adapter as defined in claim 5 wherein the communication device comprises a wireless-capable modem.

7. An interface adapter as defined in claim 6, wherein the computer modem is a PCMCIA modem.

8. A connection system for interfacing with a two-wire telephone line, the connection system comprising:

a communication device having a communication device transmitting wire, a communication device receiving wire, and a plurality of digital signals, including a dc voltage signal;

a telephone set base capable of connection to the two-wire telephone line, and further having a pair of base transmitting wires and a pair of base receiving wires for detachable interconnection with a telephone handset; and an interface adapter capable of interconnecting with the communication device and receiving the plurality of digital signals, in the interface adapter having circuitry capable of electrically converting a transmit signal present on the communication device transmitting wire and a receive signal present on the communication device receiving wire with the corresponding pair of base transmitting wires and the pair of base receiving wires, whereby the communication device is capable of communicating data to the two-wire telephone line in a data mode state, and wherein electrical power for the circuitry is obtained via the dc voltage signal.

9. A connection system as defined in claim 8 further comprising cable detector means for detecting whether the communication device is electrically connected to the interface adapter.

10. A connection system as defined in claim 9, wherein the cable detector means comprises:

indicator circuit means, disposed on the interface adapter, for generating a cable connection signal; and detection circuit means, disposed on the communication device and responsive to the cable connection signal, for generating a cable detect signal, the cable detect signal being indicative of whether the communication device is electrically connected to the interface circuit.

11. A connection system for interfacing with a two-wire telephone line, the connection system comprising:

a modem having a coder/decoder (CODEC) electrically connected to a modem transmitting wire capable of carrying a transmit signal and a modem receiving wire capable of carrying a receive signal;

a telephone set base capable of connection to the two-wire telephone line, and further having a pair of base transmitting wires and a pair of base receiving wires for detachable interconnection with a telephone handset that includes a pair of handset transmitting wires and the pair of handset receiving wires;

an interface adapter comprising:

base connector means for electrically connecting to the pair of base transmitting wires and the pair of base receiving wires of the telephone set base;

communication device digital interface connector means for electrically connecting to the modem transmitting wire and the modem receiving wire of the modem; and an interface circuit for electrically converting between the transmitting and receiving wires of the digital interface connector and the pairs of base transmitting and receiving wires of the base connector.

12. A connection system as defined in claim 11 further comprising cable detector means for detecting whether the modem is electrically connected to the interface adapter.

13. A connection system as defined in claim 12, wherein the cable detector means comprises:

indicator circuit means, disposed on the interface adapter, for generating a cable connection signal; and detection circuit means, disposed on the modem, for detecting the status of the cable connection signal so as to determine whether the modem is operatively connected to the interface adapter.

14. A connection system as defined in claim 11, wherein the base connector means is comprised of a modular telephone base jack, the base jack being capable of detachably receiving a base plug that is electrically connected to the telephone base.

15. A connection system as defined in claim 11, wherein the communication device digital interface connector means is comprised of a modular data jack, the data jack being capable of detachably receiving a data plug that is electrically connected to the communication device.

16. A connection system as defined in claim 11, wherein the modem is a PCMCIA cellular-capable modem that is operatively coupled to a host computer via a PCMCIA compliant socket.

\* \* \* \* \*

UNITED STATES PATENT AND TRADEMARK OFFICE
CERTIFICATE OF CORRECTION

PATENT NO. : 6,697,464,B1
DATED : February 24, 2004
INVENTOR(S) : Jon A. Nelson et al.

It is certified that error appears in the above-identified patent and that said Letters Patent is hereby corrected as shown below:

Column 1,
Line 25, delete "2. Related Technology"
Line 26, change "3. The Relevant Technology" to -- 2. The Relevant Technology --
Line 54, change "transmission path" to -- transmit path --
Line 61, change "a RJ-type" to -- an RJ-type --

Column 2,
Line 40, change "a RJ-type" to -- an RJ-type --

Column 3,
Lines 43 and 56, change "insure" to -- ensure --
Line 56, insert -- the -- before "adapter"

Column 4,
Line 11, change "and for interfacing" to -- , and for interfacing --

Column 5,
Line 45, change "modern" to -- modem. --
Line 61, change "programmable" to -- programmably --

Column 6,
Line 62, change "drawing" to -- drawings --

Column 8,
Line 23, insert -- a -- after "require connection to"
Lines 55-56, change "an telephone base portion" to -- a handset portion --

Column 9,
Line 36, insert -- the -- after "not limitation,"
Line 59, insert -- for -- before "four communications lines"

Column 10,
Line 45, change "reduced" to -- reduces --

Column 11,
Line 2, change "performs" to -- perform --

UNITED STATES PATENT AND TRADEMARK OFFICE
CERTIFICATE OF CORRECTION

PATENT NO. : 6,697,464,B1
DATED : February 24, 2004
INVENTOR(S) : Jon A.

It is certified that error appears in the above-identified patent and that said Letters Patent is hereby corrected as shown below:

Column 12,
Line 30, change "10. Portable computer" to -- 10. The portable computer --

Column 14,
Line 31, change "telephone's." to -- telephone. --
Line 51, change "determined" to -- determine --

Column 15,
Line 42, insert -- the -- before "base connection means"

Column 16,
Line 4, change "e.g., Vcc 386 and ground 387" to -- (e.g., Vcc 386 and ground 387) --
Line 6, insert -- , -- after "additional signals"
Line 7, insert -- , -- after "identification data 390"
Line 13, change "double ended" to -- double-ended --
Line 15, change "single ended" to -- single-ended --
Line 39, change "signals which" to -- signals, which --
Lines 48-49, move "FIG. 8 depicts a schematic diagram of interface circuity 356." so that it is the first sentence of the next paragraph beginning with "Interface adapter 354 is comprised…"

Column 17,
Line 19, change "compasitor" to -- capacitor --

Column 18,
Line 54, insert -- of -- before "receive signals"

Signed and Sealed this

Twenty-fourth Day of August, 2004

JON W. DUDAS
*Director of the United States Patent and Trademark Office*